United States Patent

Lim

[11] Patent Number: 5,598,444
[45] Date of Patent: Jan. 28, 1997

[54] SYNC DETECTING APPARATUS AND METHOD THEREOF

[75] Inventor: Kwang W. Lim, Seoul, Rep. of Korea

[73] Assignee: Hyundai Electronics Industries Co., Ltd., Kyoungki-do, Rep. of Korea

[21] Appl. No.: 399,109

[22] Filed: Mar. 3, 1995

[30] Foreign Application Priority Data

Mar. 7, 1994 [KR] Rep. of Korea ................. 94-4371

[51] Int. Cl.⁶ ........................................... H04L 7/00
[52] U.S. Cl. ........................ 375/368; 348/500; 375/340
[58] Field of Search ........................ 375/261, 340, 375/364, 368, 365, 354, 362; 370/105.1, 105.4, 105.5, 106; 348/583, 500

[56] References Cited

U.S. PATENT DOCUMENTS

| | | | |
|---|---|---|---|
| 4,680,766 | 7/1987 | Wilkinson | 375/365 |
| 5,049,830 | 9/1991 | Yoshida | 375/371 |
| 5,200,811 | 4/1993 | Cho | 348/367 |
| 5,339,337 | 8/1994 | Levine | 375/365 |
| 5,398,260 | 3/1995 | Min | 375/341 |
| 5,400,366 | 3/1995 | Iwamatsu | 375/261 |
| 5,422,916 | 6/1995 | Nall | 375/368 |

*Primary Examiner*—Tesfaldet Bocure
*Attorney, Agent, or Firm*—Jordan and Hamburg

[57] ABSTRACT

A sync detecting apparatus and method thereof in an error correction technique employed for transmitting highly-reliable information even under poor channel environment in a transmission system of a high definition television (HDTV) includes a first sync detector for comparing a signal transmitted from a receiver with a previously-recognized reference signal to detect a sync signal and rotated amount thereof, a rotation compensator for compensating the rotated amount of the signal detected in the first sync detector, and a second sync detector for accurately detecting the synchronization in accordance with periodicity of the sync signal in case an error included an output signal from the rotation compensator, thereby effectively detecting the sync signal from the signal received into the receiver of the HDTV for performing interleave/deinterleave of the error correction technique as well as compensating the rotation of the signal.

4 Claims, 7 Drawing Sheets

SYNC DETECTING APPARATUS AND METHOD THEREOF

BACKGROUND OF THE INVENTION

The present invention relates to an error correcting technique employed for transmitting highly reliable information even under poor channel environment in a transmission system of a high definition television (hereinafter simply referred to as "HDTV"), and more particularly to a sync detecting apparatus and method thereof for effectively detecting a sync signal from a signal received in a receiver of a HDTV to perform interleave/deinterleave of the error correcting technique.

In connection with receivers of HDTVs, U.S. Pat. No. 5,200,811 discloses a technique wherein a received signal is separated into narrow and intermediate frequency (IF) bands, and the signal separated into the narrow and IF bands is locked to a predetermined stable frequency to demodulate the separated if by quadrature phase, and respective signals demodulated by quadrature phase are low-pass filtered to be converted into digital data. Then, data converted from the digital data is delayed for a predetermined time, and mixed with a signal processed in a high band, so that the obtained result is separated into a luma signal and a color difference signal to be converted into an analog signal. As a result, the audio/video receiving apparatus becomes compatible with existing color televisions. In brief, the technique employed in the above patent is a decoding used for reception by means of band separation and sub-sampling methods.

On the other hand, for executing the deinterleave in a receiver of an HDTV, a sync signal is detected from a received signal, and rotation compensation is performed by recognizing a rotated amount of the received signal.

The above-stated two operations are the function of a sync detector.

Meanwhile, in a frame format suggested in the channel compatible digicipher HDTV system (CCDC), an initial three bytes are used for the synchronization of the deinterleave.

That is, a reference signal of a symbol unit capable of being used for the synchronization numbers six.

In the present invention, five signals are utilized as the reference signals, and the remaining one signal is used as an additional signal to be employed in setting up the system.

When an encoding is executed in a trellis encoder, space for involving six signals is not encoded but filled with preset five reference signals and one additional signal.

The receiver compares the transmitted signal with the preset reference signals to detect the sync signal required for the deinterleave.

SUMMARY OF THE INVENTION

It is an object of the present invention to provide a sync detecting apparatus and method thereof for effectively detecting a sync signal from a signal received by a receiver of an HDTV to perform interleave/deinterleave.

It is another object of the present invention to provide a sync detecting apparatus and method thereof for compensating rotation of a detected sync signal.

To achieve the above object of the present invention, there is provided a sync detecting apparatus which includes a first sync detector for comparing a signal transmitted from a receiver with a previously-recognized reference signal to detect a sync signal and a rotated amount thereof, a rotation compensator for compensating the rotated amount of the signal detected in the first sync detector, and a second sync detector for accurately detecting the synchronization in accordance with a periodicity of the sync signal in case of a remaining rotation error included in the signal input to the rotation compensator.

To achieve another object of the present invention, there is provided a sync detecting method including the steps of determining whether a signal passes through a first sync detecting circuit or not after initializing a system, determining whether a first counting value is of a frame length or not when the signal passes through the first sync detecting circuit, determining whether a second counting value is of the frame length or not when the first counting value is not of the frame length. Then, a second sync signal is set to one when the second counting value is not of the frame length, the minimum value of the second sync signal is obtained when the second counting value is of the frame length, and the second counting value is cleared to zero. Thereafter, the method is performed in the order of the steps of obtaining the minimum value of a first sync signal when the first counting value is of the frame length in the first counting value determining step, obtaining the minimum value of the first sync signal to clear the first counting value to determine whether the first sync signal is larger than one or not, detecting synchronization when the first sync signal is larger than one, determining whether the first counting value is of the frame length when the signal does not pass through the first sync detecting circuit in the step of determining the signal passing through the first detecting circuit, obtaining the maximum value of the first sync signal when the first counting value is of the frame length, clearing the first counting value to zero for detecting the synchronization after obtaining the maximum value of the first sync signal, determining whether the second counting value is of the frame length when the first counting value is not of the frame length in the first counting value determining step, obtaining the maximum value of the first sync signal when the second counting value is of the frame length to clear the second counting value to zero, comparing the second sync signal with the first sync signal after clearing the second counting value to zero, changing the first and second sync signals and the first and second counting values when the second sync signal is larger than the first sync signal, determining whether the changed first sync signal is larger than zero or not, incrementing the first counting value by one when the first sync signal is larger than zero, determining whether the second sync signal is larger than zero after incrementing the first counting value, and incrementing the second counting value by one when the second sync signal is larger than zero.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 1:
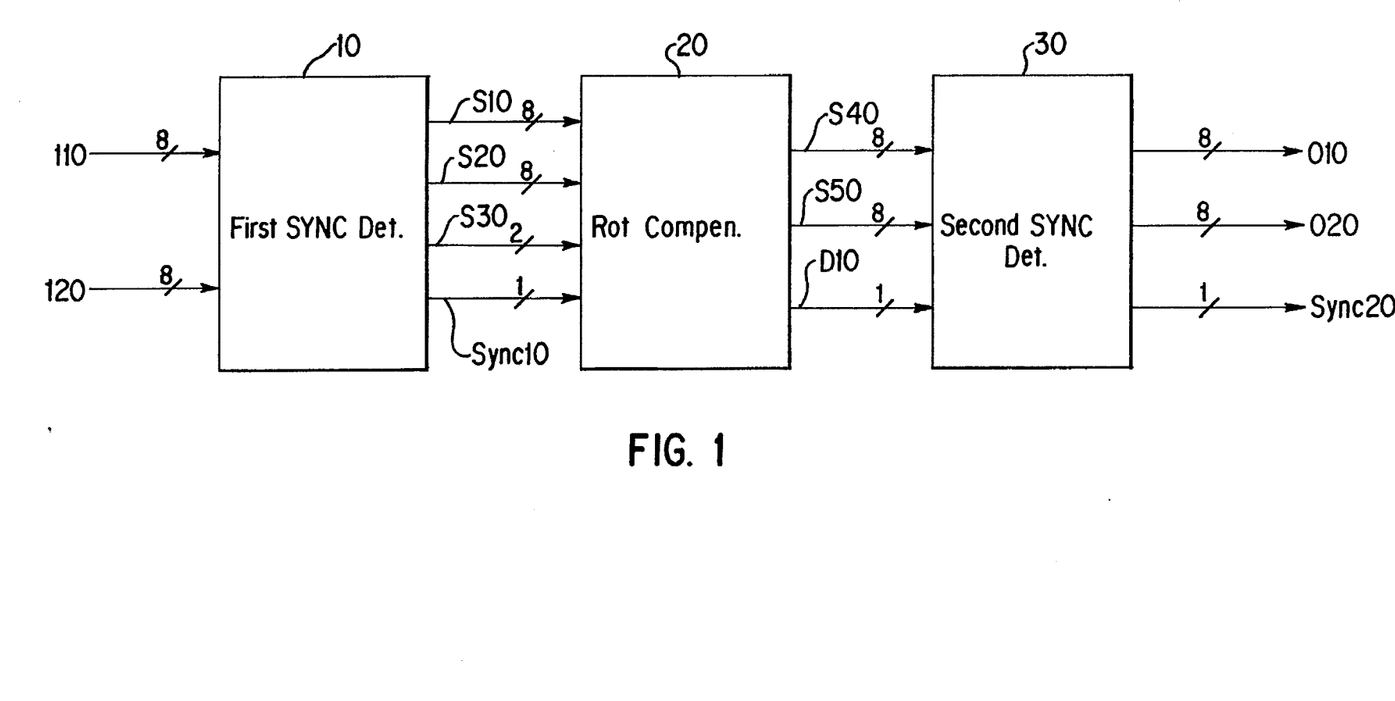
FIG. 1 is a construction view showing a sync detecting apparatus according to the present invention.

Referring to FIG. 1, a sync detecting apparatus for detecting a sync signal required for performing deinterleave according to the present invention includes a first sync detector 10 for detecting a sync signal and the rotated amount thereof by comparing a signal transmitted to a receiver and a preset reference signal, a rotation compensator for compensating the rotation of the signal detected in the first sync detector 10, and a second sync detector 30 for detecting synchronization to allow for accurately searching out the sync signal by using periodicity of the sync signal regardless of slight error occurring in the signal from the rotation compensator 20.

Figure 2:
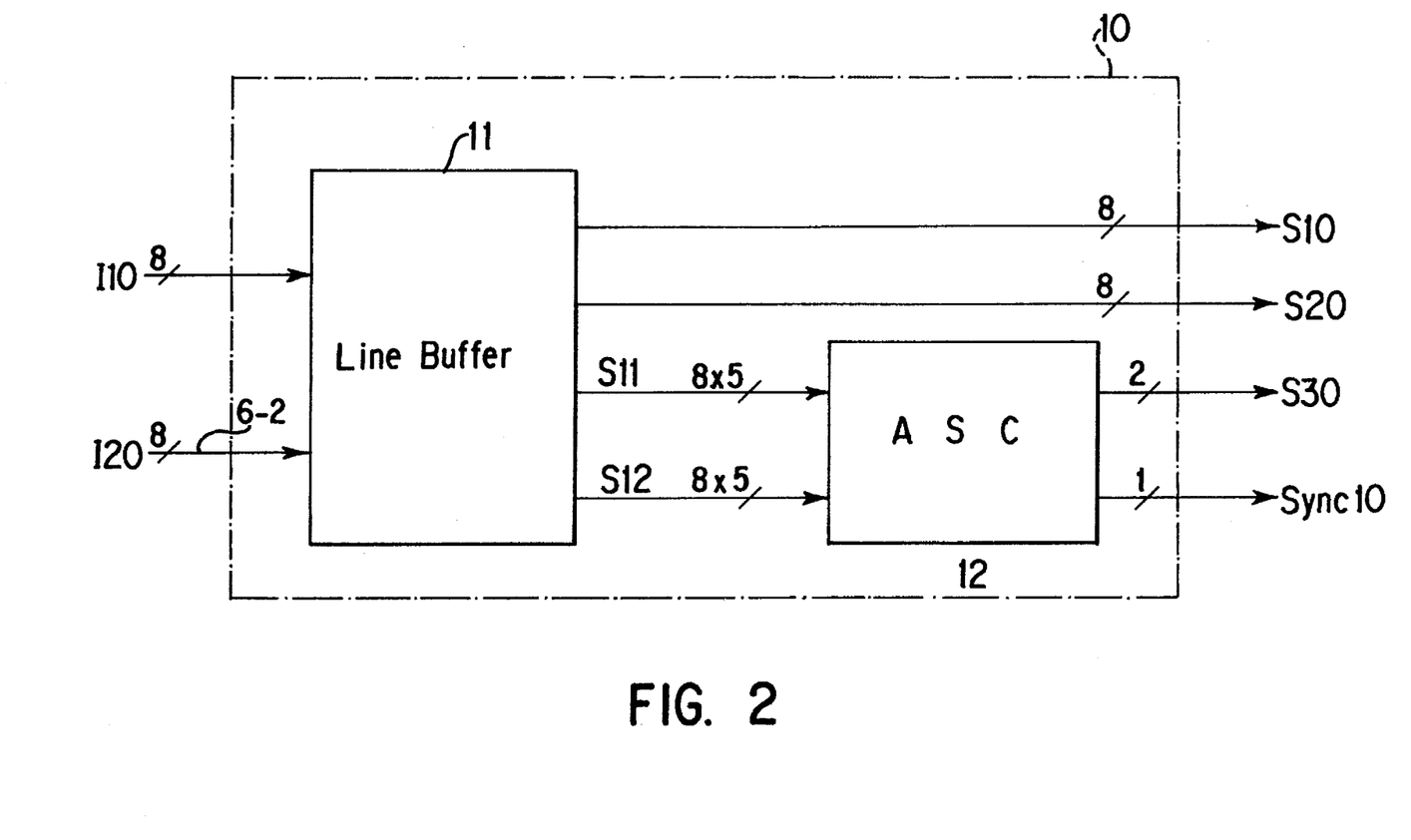
FIG. 2 is a detailed construction view showing the first sync detector of FIG. 1.

As shown in FIG. 2, the first sync detector 10 has a line buffer 11 for delaying to supply the received input signal, and an addition/subtraction comparator 12 for adding or subtracting the signals delayed in the line buffer II to generate a signal representing the rotated amount of the signal and the sync signal.

Figure 3:
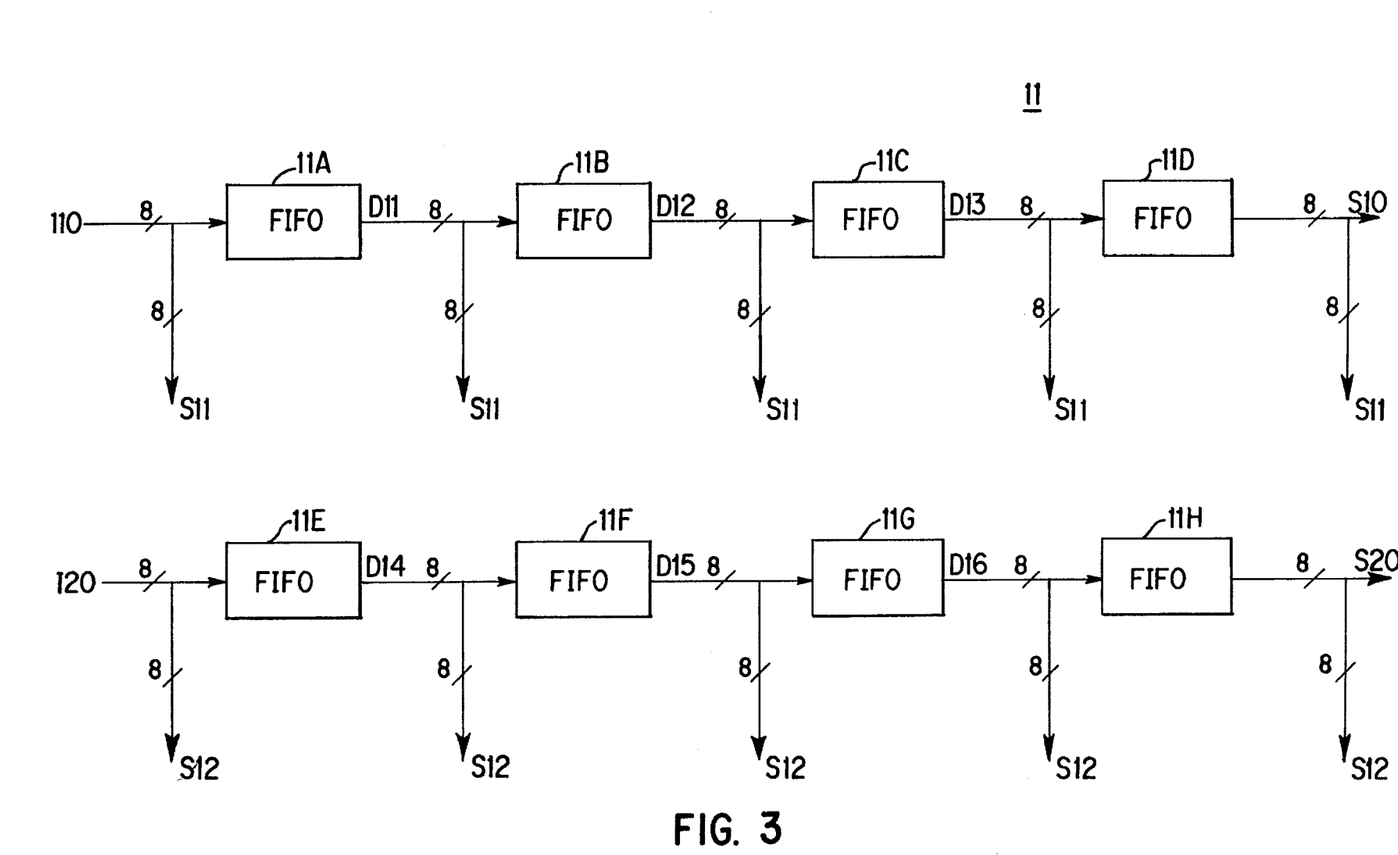
FIG. 3 is a detailed construction view showing the line buffer of FIG. 2.

As shown in FIG. 3, the line buffer 11 consists of FIFO memories 11A to 11H for delaying to supply the input signal by predetermined steps.

Figure 4:
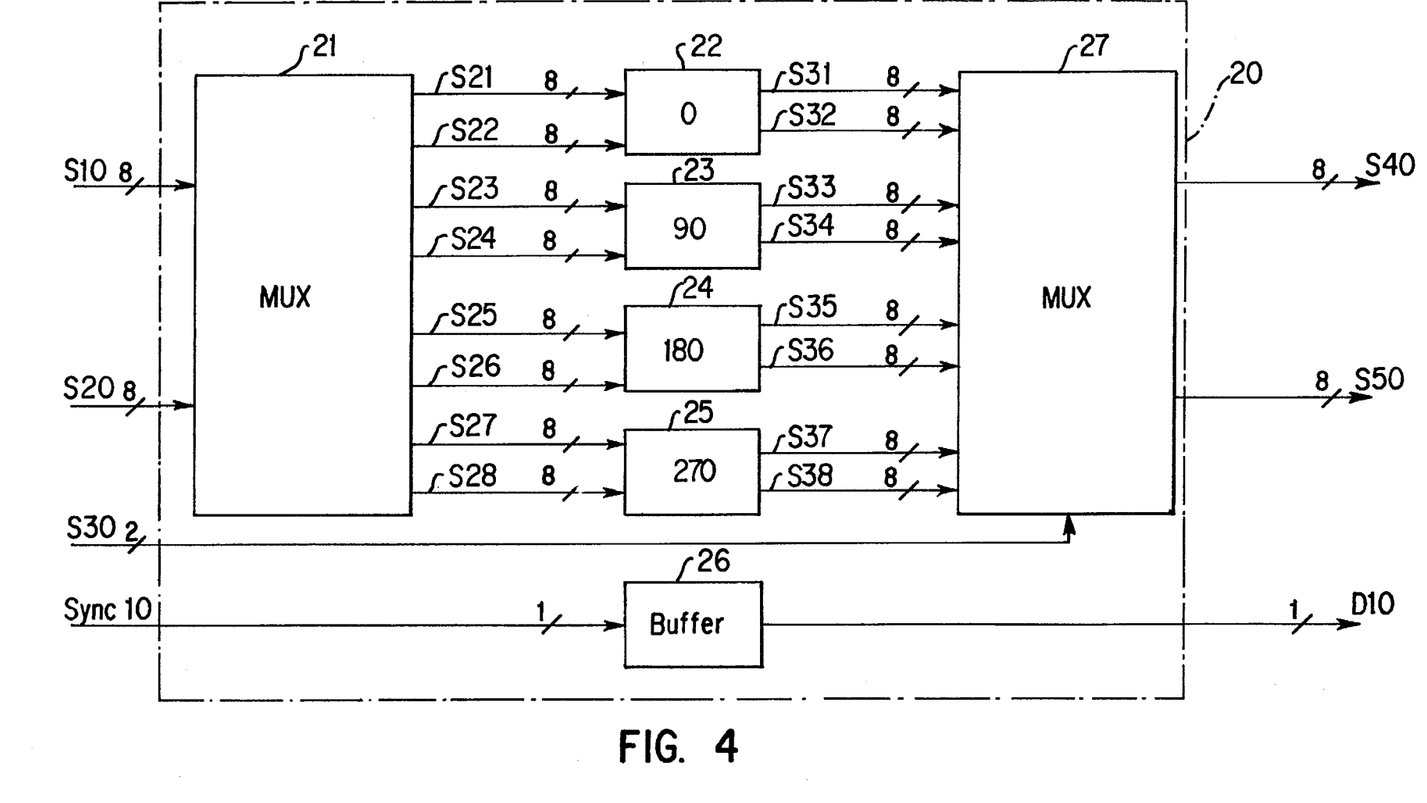
FIG. 4 is a detailed construction view showing the rotation compensator of FIG. 1.

As shown in FIG. 4, the rotation compensator 20 includes a first multiplexer 21 for separating to supply the input signal into a plurality of independent information signals, buffers 22 to 25 for compensating respective signals from the first multiplexer 21 as much as the rotated amount in conformity with rules expressed as expressions (9) to (12) herein after, and a second multiplexer 27 for receiving the signals of which a rotated amount is respectively compensated by the buffers 22 to 26 to select and supply a single signal. The rotation compensator 20 further includes a buffer 26 for generating a sync signal D10 in accordance with a sync signal 20.

Hereinafter, the operation and effect of the sync detecting apparatus according to the present invention constructed as above will be described with reference to FIGS. 1 to 5 in detail.

in association with the operation of the first sync detector 10, the following equations (1) and (2) are developed for each symbol, assuming that the received signal string is designated by x[n] (where n=0,1,2, . . . . ), the reference signal for recognizing the sync signal required for the deinterleave is r[i] (where i=0, . . . ., 4), a value of rotating a signal "s" as much as θ (=0°, 90°, 180° and 270°) is $T_{\theta(s)}$, and the sum of the absolute values of I-axis and Q-axis is |·|:

$$d_0^1 = \sum_{i=0}^{4} |x[n-20i] - T_\theta(r[4-i])| \quad \text{expression(1)}$$

$$d_0^2 = \sum_{i=0}^{3} |x[n-20i] - T_\theta(r[3-i])| \quad \text{expression(2)}$$

At this time, if an input signal satisfying the following relation is detected, this signal is determined as the sync signal rotated as much as θ.

$$d_\theta^1 < TL \text{ and } d_\theta^2 > TH \quad \text{expression(3)}$$

where the angle θ is 0°, 90°, 180° and 270°, and reference symbols TL and TH denote threshold values of the reference signal.

When the relation of expression (3) is satisfied with respect to one signal by the plural rotation angles θ, an angle θ that has the maximum value in accordance with the following equation (4) is determined as the rotated amount:

$$D = d_\theta^2 - d_\theta^1 \quad \text{expression(4)}$$

Here, the threshold value TH and TL of the reference signal are determined as below.

In order to avoid repetition of the reference signal used, the reference signals are determined in such a manner that signals rotated by as much as 90° and 170° are excluded among the previously-determined reference signals.

For recognizing rotated amount of the signal, a signal satisfying the following relation will be selected.

$$\min(d_{90}^1 d_{180}^1 d_{270}^1) > d_0^1 \quad \text{expression(5)}$$

$$\max(d_{90}^2 d_{180}^2 d_{270}^1) < d_0^1 \quad \text{expression(6)}$$

The threshold values are set by values satisfying the following relation.

$$d_0^1 < TL < \min(d_{90}^1, d_{180}^1, d_{270}^1) \quad (7)$$

$$\max(d_{90}^2, d_{180}^1, d_{270}^1) < TH < d_0^2 \quad \text{expression(8)}$$

Figure 5:
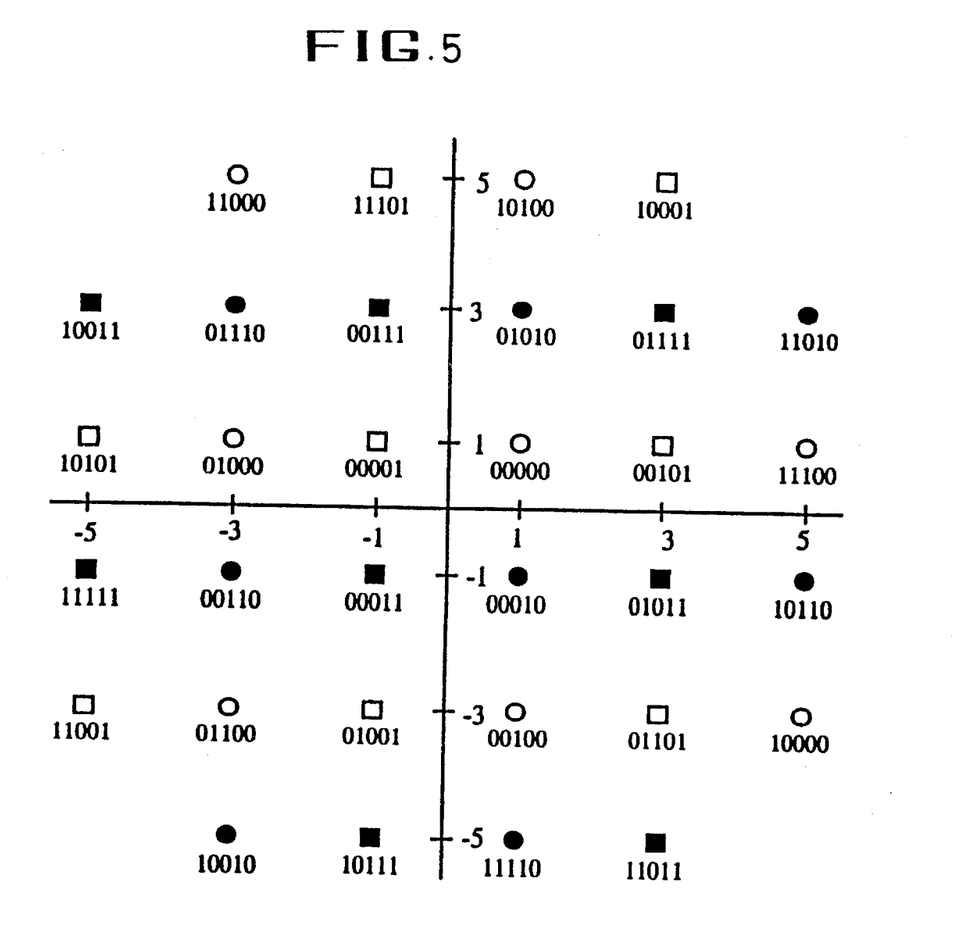
FIG. 5 is an illustration of a signal constellation.

If the reference signals and additional signal are designated by binary numbers, they are written as:

$T_0(r)=(10011, 11011, 00010, 10101, 11110, 00111)$ in case of no rotation.\;

$T_{90}(r)=(10010, 11010, 00000, 10111, 11100, 00110)$ in case of rotation by 90°;

$T_{180}(r)=(10000, 11000, 00001, 10110, 11101, 00100)$ in case of rotation by 180°; and $T_{270}(r)=(10001, 11001, 00011, 10100, 11111, 00101)$ in case of rotation by 270°, of which signal constellation is illustrated in FIG. 5.

At this time, the threshold values are 36 for TH, and 8 for TL.

A received signal I10 is received into the line buffer 11 to be delayed for 80 step, and supplied as a signal S10 which is utilized as an input of the rotation compensator 20.

Also, the current signal I10, a signal D11 delayed by 20 step via the FIFO memory 11A, a signal D12 delayed by 40 step via the FIFO memory 11B, a signal D13 delayed by 60 step via the FIFO memory 11C, the signal S10 delayed by 80 step via the FIFO memory 11D, and the like are expressed as a signal S11 via the line buffer 11 which in turn is supplied to the addition/subtraction comparator 12.

In the same manner, a current signal I20, a signal D14 delay by 20 step, a signal D15 delayed by 40 step, a signal D16 delayed by 60 step, a signal S20 delayed by 80 step, and the like are expressed as a signal S12 which is supplied to the addition/subtraction comparator 12.

The addition/subtraction comparator 12 performs the operations of expressions 1 to 4.

When the received signal satisfies the condition of expression(3), the comparator 12 generates a sync signal Sync10, and a signal S30 in view of the rotated amount of the signal.

The signal S30 produces 00 in case of no rotation of the signal, 01 in case of rotation by as much as 90°, 10 in rotation by as much as 180° and 11 in rotation by as much as 270°.

The rotation compensator 20 executes the rotation compensation in conformity with the following equations.

When the signal is rotated by 0°: $f(I,Q)=(I,Q)$ expression(9)

When the signal is rotated by 90°: $f(I,Q)=(Q,-I)$ expression(10)

When the signal is rotated by 180°: $f(I,Q)=(-I,-Q)$   expression(11)

When the signal is rotated by 270°: $f(I,Q)(-Q,I)$   expression(12)

Once the signals S10 and S20 are received into the first multiplexer 21 which divides the received signals into signals S21 to S28, the buffers 22 to 25 perform the compensation with respect to the signals as much as the rotated amount of the signals by 0°, 90°, 180° and 270° in conformity with expressions (9) to (12). Then, the second multiplexer 27 is used to select any one among the compensated signals to output as signals S40 and S50.

The second sync detector 30 receives the input signals S40 and S50 from the rotation compensator 20, and a sync signal D10 from the rotation compensator 20, thereby supplying signals 010 and 020 and sync signal Sync20.

Therefore, even though an error slightly occurs in the first sync detector 10, the sync signal Sync20 is accurately output, so that the sync signal Sync20 can be accurately detected regardless of the error occurrence.

Figure 6A:
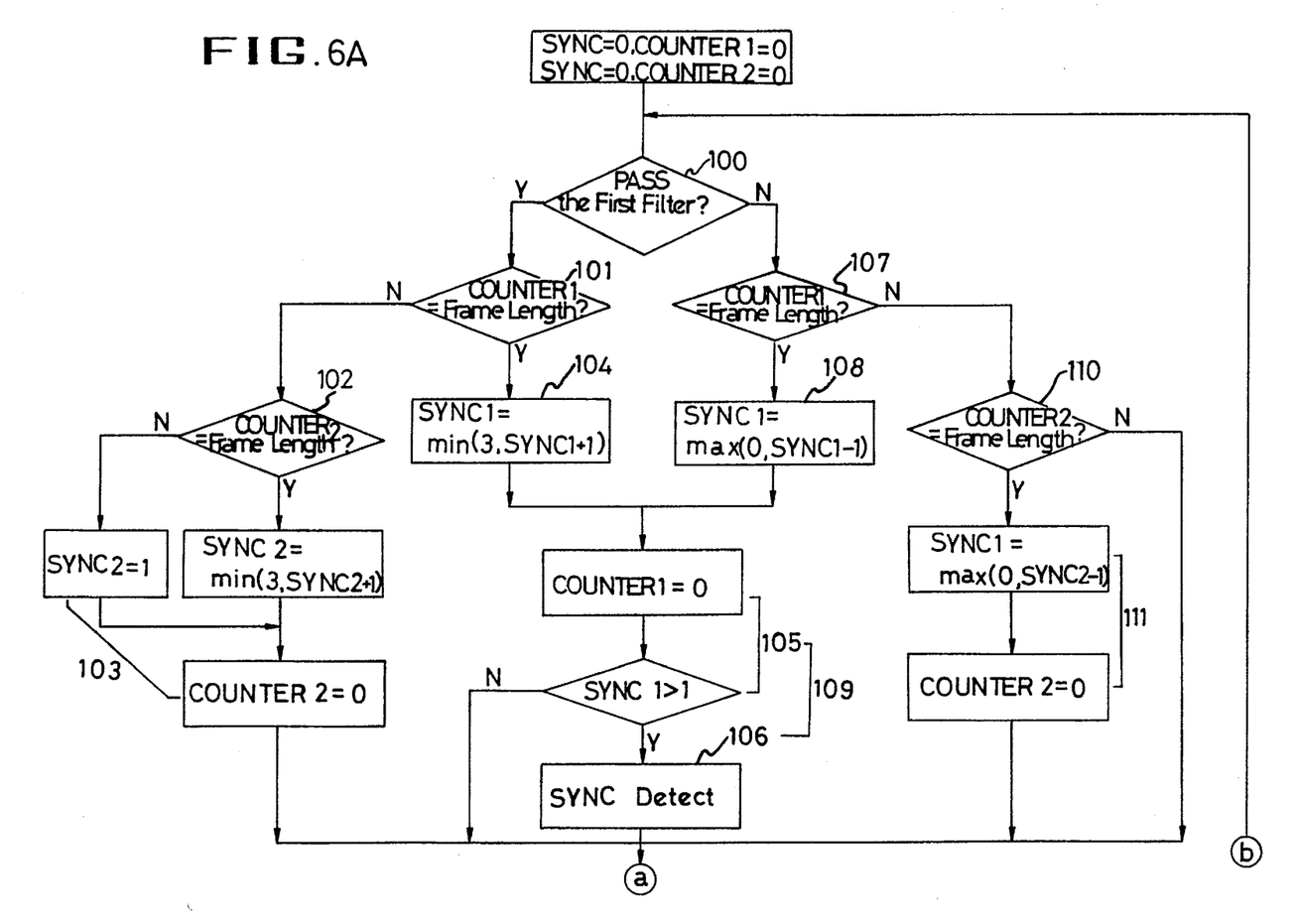
FIGS. 6A and 6B are a continuous flowchart for performing a sync detecting method according to the present invention.
Figure 6B:
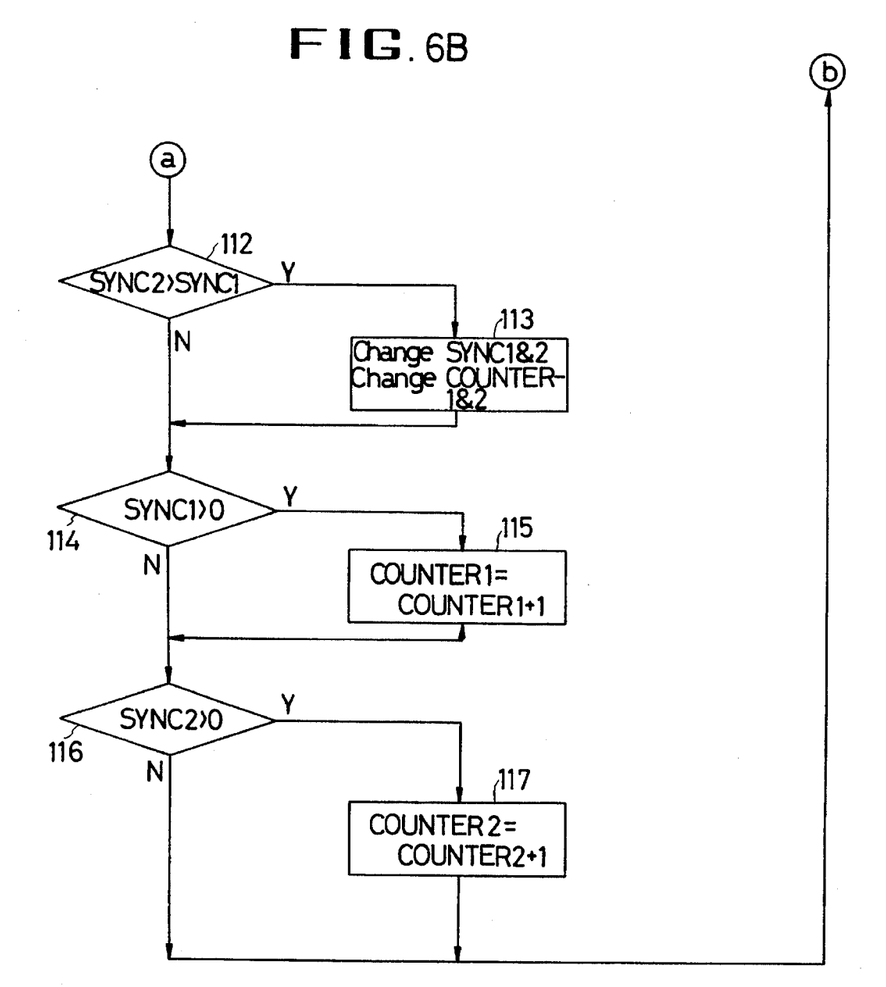

Referring to FIGS. 6A and 6B, a sync signal detecting method will be described.

After the system is initialized for operation, it is determined whether a signal passes through the first detector or not (step 100). If it passes through the first sync detector, a first counting value is determined whether it is of a frame length or not (step 101), and whether a second counting value is of the frame length or not (step 10E) when the first counting value is not of the frame length. If the second counting value is not of the frame length, the second sync signal is set to "1"; whereas, the minimum value of the second sync signal is obtained if the second counting value is of the frame length, and the second counting value is cleared to zero (step 103). Meantime, when the first counting value is of the frame length in step 101, the minimum value of the first sync signal is obtained (step 104). After obtaining the minimum value of the first sync signal, the first counting value is cleared to zero, and it is determined whether the first sync signal is larger than one "one" or not (step 105). If the first sync signal is larger than "one", the sync is detected (step 106). On the other hand, if the signal does not pass through the first sync detector in step 100, it is determined whether the first counting value is of the frame length or not (step 107). When the first counting value is of the frame length, the maximum value of the first sync signal is obtained (step 108). After obtaining the maximum value of the first sync signal, the First counting value is cleared to zero for detecting the sync (step 109). If the first counting value is not of the frame length in step 107, it is determined whether the second counting value is of the frame length or not (step 110). If the second counting value is of the frame length, the maximum value of the first sync signal is obtained, and then the second counting value is cleared to zero (step 111). Upon clearing the second counting value to zero, the second and first sync signals are compared (step 112). If the second sync signal is larger than the first sync signal, the first and second sync signals and first and second counting values are changed (step 113). Successively, by determining whether the changed first sync signal is greater than "zero" (step 114), the first counting value is incremented by "one" (step 115) when the first sync signal is larger than "zero". After incrementing the first counting value, it is determined whether the second sync signal is larger than "zero" or not (step 116), and the second counting value is incremented by "one" (step 117) if the second sync signal is greater than "zero".

In the sync detecting apparatus and method thereof according to the present invention as described above, the sync signal can be effectively detected from a received signal even under poor channel environment and, simultaneously, compensate rotation of the signal.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A sync detecting apparatus comprising:

a first sync detecting circuit for comparing a received input signal transmitted from a receiver with a previously-recognized reference signal to detect a sync signal and a rotated amount thereof;

a rotation compensating circuit for compensating for the rotated amount of the sync signal detected in said first sync detecting circuit to produce a compensated sync signal; and a second sync detecting circuit for further accurately detecting the synchronization in accordance with a periodicity of said sync signal in case of a remaining rotation error included in the compensated sync signal from said rotation compensating circuit.

2. A sync detecting circuit as claimed in claim 1, wherein said rotation compensating circuit comprises:

a first multiplexer for separating to supply sync input signals from said first sync detecting circuit into a plurality of independent information signals:

buffers for compensating the signals from said first multiplexer for the rotated amount in accordance with rules for compensating every 90 degree increment including 0, 90, 180 and 270 degrees ; and a second multiplexer for receiving signals respectively rotation-compensated by said buffers, and selecting to output any one signal.

3. A sync detecting circuit comprising:

a first sync detecting circuit for comparing a signal transmitted from a receiver with a previously-recognized reference signal to detect a sync signal and a rotated amount thereof:

a rotation compensating circuit for compensating for the rotated amount of the sync signal detected in said first sync detecting circuit to produce a compensated sync signal a second sync detecting circuit for further accurately detecting the synchronization in accordance with a periodicity of said sync signal in case of a remaining rotation error included in the compensated sync signal from said rotation compensating circuit; and said first sync detecting circuit including a line buffer for delaying the received input signal and an addition/subtraction comparator for adding and subtracting with respect to the signal delayed in said line buffer to generate a signal representing the rotated amount of the received input signal and said sync signal.

4. A sync detecting method comprising the steps of:

determining whether a signal passes through a first sync detecting circuit or not after initializing a system;

determining whether a first counting value is of a frame length or not when said signal passes through said First sync detecting circuit;

determining whether a second counting value is of the frame length or not when said first counting value is not of the frame length;

setting a second sync signal to one when said second counting value is not of the frame length, obtaining the minimum value of said second sync signal when said second counting value is of the frame length, and clearing said second counting value to zero;

obtaining the minimum value of a first sync signal when said first counting value is of the frame length in said first counting value determining step;

obtaining the minimum value of said first sync signal to clear said first counting value, and determining whether said first sync signal is larger than one or not;

detecting synchronization when said first sync signal is larger than one;

determining whether said first counting value is of the frame length when said signal does not pass through said first sync detecting circuit in said step of determining said signal passing through said first detecting circuit;

obtaining the maximum value or said first sync signal when said first counting value is of the frame length;

clearing said first counting value to zero for detecting the synchronization after obtaining said maximum value of said first sync signal;

determining whether said second counting value is of said frame length when said first counting value is not of the frame length in said first counting value determining step;

obtaining said maximum value of said first sync signal when said second counting value is of the frame length, and clearing said second counting value to zero;

comparing said second sync signal with said first sync signal after clearing said second counting value to zero;

changing said first and second sync signals and said first and second counting values when said second sync signal is larger than said first sync signal;

determining whether the changed first sync signal is larger than zero or not;

incrementing said first counting value by one when said first sync signal is larger than zero;

determining whether said second sync signal is larger than zero after incrementing said first counting value; and incrementing said second counting value by one when said second sync signal is larger than zero.

* * * * *